(12) United States Patent
Collette et al.

(10) Patent No.: US 8,082,961 B2
(45) Date of Patent: Dec. 27, 2011

(54) TIRE WITH RETRACTABLE STUD

(75) Inventors: Jean Joseph Victor Collette, Arlon (BE); Andre Cuny, Habay-La-Neuve (BE); Frank Pierre Severens, Frassem/Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 704 days.

(21) Appl. No.: 12/236,774

(22) Filed: Sep. 24, 2008

(65) Prior Publication Data

US 2009/0165912 A1 Jul. 2, 2009

Related U.S. Application Data

(60) Provisional application No. 61/018,197, filed on Dec. 31, 2007.

(51) Int. Cl.
*B60C 27/00* (2006.01)
(52) U.S. Cl. ...................... 152/210; D12/608
(58) Field of Classification Search .................. 152/210; D12/535, 564, 608
See application file for complete search history.

(56) References Cited

U.S. PATENT DOCUMENTS

| | | | |
|---|---|---|---|
| 3,480,062 A | 11/1969 | Hillhouse | 152/210 |
| 3,665,992 A | 5/1972 | Rossel | 152/208 |
| 3,672,421 A | 6/1972 | Anderson | 152/208 |
| 3,693,688 A | 9/1972 | Schuman | 152/210 |
| 3,712,358 A | 1/1973 | Einarsson | 152/208 |
| 3,747,659 A | 7/1973 | Caniz | 152/210 |
| 3,766,956 A | 10/1973 | Ruane et al. | 152/208 |
| 3,872,908 A | 3/1975 | Einarsson | 152/208 |
| 3,926,239 A | 12/1975 | Petersons et al. | 152/210 |
| 3,942,572 A | 3/1976 | Crandall | 152/208 |
| 4,076,065 A | 2/1978 | Somers | 152/210 |
| 4,171,718 A | 10/1979 | Walrave et al. | 152/222 |
| 4,619,301 A * | 10/1986 | Hiroki | 152/210 |
| 4,676,289 A | 6/1987 | Yi Su | 152/210 |
| 4,815,513 A | 3/1989 | Hirakawa | 152/210 |
| 4,844,137 A | 7/1989 | Einarsson | 152/210 |
| 4,883,104 A | 11/1989 | Minami | 152/210 |
| 5,088,534 A | 2/1992 | Engel | 152/208 |
| 5,198,048 A | 3/1993 | Hojo | 152/210 |
| 5,198,049 A | 3/1993 | Hojo | 152/210 |

(Continued)

FOREIGN PATENT DOCUMENTS

DE 2645639 A1 4/1977

(Continued)

OTHER PUBLICATIONS

European Search Report completed May 12, 2009.

*Primary Examiner* — Matthew Daniels
*Assistant Examiner* — Jacob Thomas Minskey
(74) *Attorney, Agent, or Firm* — June E. Rickey

(57) ABSTRACT

A retractable stud pin assembly is described for use in a conventional tire. The stud pin assembly includes a housing having an elastomer compartment and a spring in cooperation with the elastomer. A stud pin is mounted to the spring. The assembly may further optionally include a fluid compartment in cooperation with the elastomer compartment and the spring. The assembly may further include a second compression spring, which cooperates with the first spring and stud pin. An optional adjustment nut may be used to manually raise and lower the pin height as desired. An optional adjustment pin may also be used to extend into an optional fluid compartment to fine tune the pin height.

8 Claims, 9 Drawing Sheets

U.S. PATENT DOCUMENTS

| | | | | |
|---|---|---|---|---|
| 5,221,379 | A | 6/1993 | Nicholas | 152/212 |
| 5,411,070 | A | 5/1995 | Yadegar | 152/210 |
| 5,609,700 | A | 3/1997 | West | 152/210 |
| 5,707,463 | A * | 1/1998 | Hansen | 152/210 |
| 5,788,335 | A | 8/1998 | O'Brien | 301/45 |
| 5,800,649 | A | 9/1998 | Eromaki | 156/114 |
| 5,810,451 | A | 9/1998 | O'Brien | 301/45 |
| 6,022,082 | A | 2/2000 | O'Brien | 301/45 |
| 6,044,883 | A | 4/2000 | Noyes | 152/210 |
| 6,199,610 | B1 | 3/2001 | Yanagawa | 152/209.5 |
| 6,244,666 | B1 | 6/2001 | O'Brien | 301/45 |
| 6,386,252 | B1 | 5/2002 | O'Brien | 152/208 |
| 6,905,564 | B1 | 6/2005 | O'Brien et al. | 156/114 |
| 6,978,669 | B2 | 12/2005 | Lionetti et al. | 73/146.4 |
| 2002/0144763 | A1 | 10/2002 | Komatsu | 152/211 |
| 2005/0092411 | A1 | 5/2005 | O'Brien | 152/209.18 |
| 2006/0096683 | A1 | 5/2006 | Kahen | 152/216 |
| 2006/0158065 | A1* | 7/2006 | Pelrine et al. | 310/328 |
| 2006/0191615 | A1 | 8/2006 | O'Brien et al. | 152/209.1 |
| 2006/0213595 | A1 | 9/2006 | Volt et al. | 152/210 |
| 2007/0079915 | A1 | 4/2007 | Jones | 152/210 |
| 2007/0144646 | A1 | 6/2007 | Mancia et al. | 152/210 |

FOREIGN PATENT DOCUMENTS

| | | |
|---|---|---|
| EP | 0709238 A2 | 5/1996 |
| EP | 0844108 A1 | 5/1998 |
| FR | 2196919 | 3/1974 |
| FR | 2198851 | 4/1974 |
| FR | 2216131 | 8/1974 |
| FR | 2278510 | 2/1976 |
| FR | 2577851 A1 | 8/1986 |
| FR | 2580236 | 10/1986 |
| FR | 2581593 | 11/1986 |
| FR | 2613669 | 10/1988 |
| FR | 2805775 | 9/2001 |
| IT | 1187089 | 12/1987 |
| JP | 58112809 A | 7/1983 |
| JP | 60219104 | 11/1985 |
| JP | 61094804 A | 5/1986 |
| JP | 61295106 A | 12/1986 |
| JP | 62059109 | 3/1987 |
| JP | 62227805 A | 10/1987 |
| JP | 62231805 | 10/1987 |
| JP | 63170108 | 7/1988 |
| JP | 01229705 A | 9/1989 |
| JP | 1254408 | 10/1989 |
| JP | 2279402 | 11/1990 |
| JP | 3114904 | 5/1991 |
| JP | 6166305 | 6/1994 |
| JP | 9058225 | 3/1997 |
| JP | 09240221 A | 9/1997 |
| JP | 2001158210 | 6/2001 |
| JP | 2003039918 | 2/2003 |
| SE | 8901892-3 | 11/1990 |
| SU | 998141 A | 2/1983 |
| WO | WO 87/00488 | 1/1987 |
| WO | WO 90/10549 | 9/1990 |
| WO | WO 91/12972 | 9/1991 |
| WO | WO 97/06021 | 2/1997 |
| WO | WO 01/08907 A1 | 2/2001 |

* cited by examiner

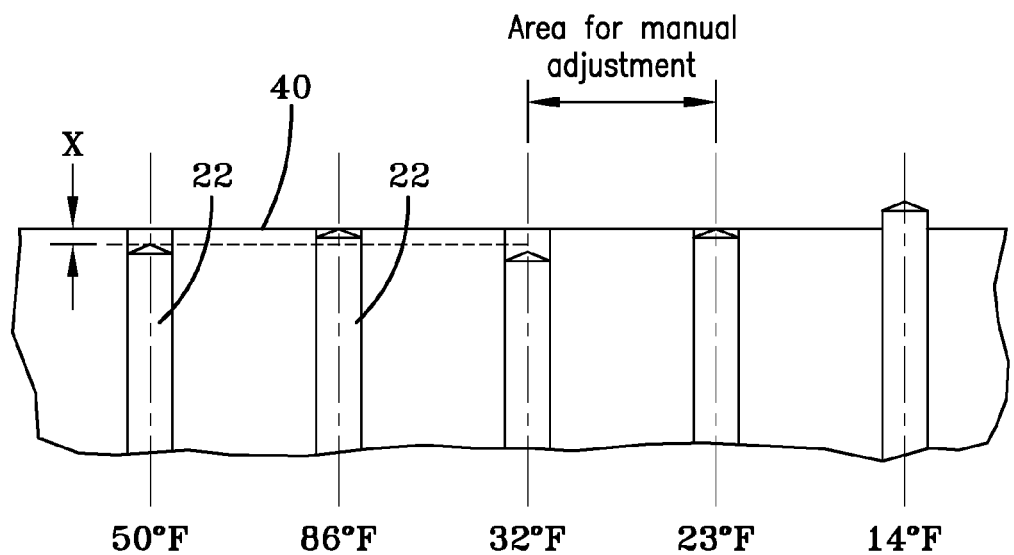
FIG-8
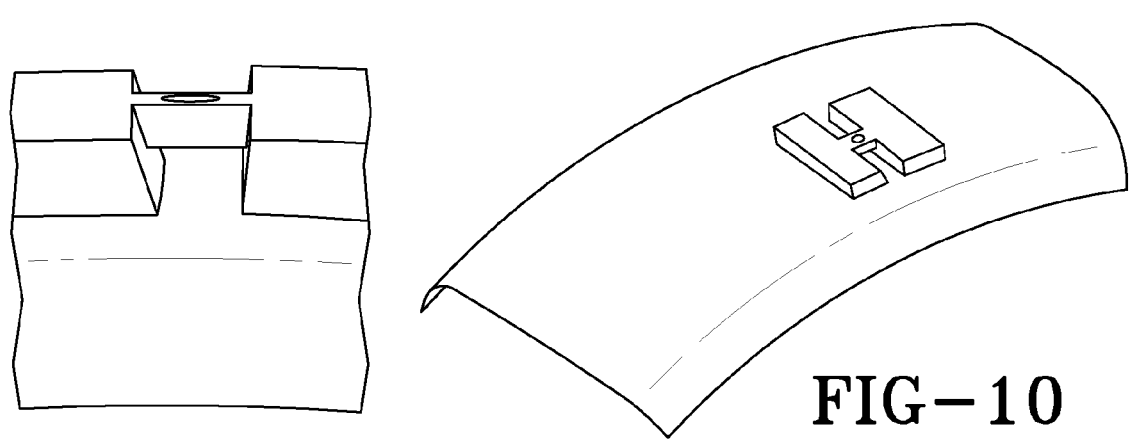
FIG-9
FIG-10

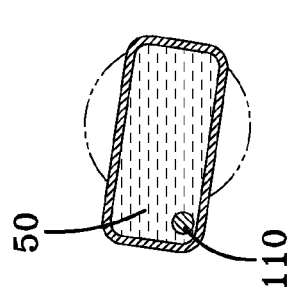
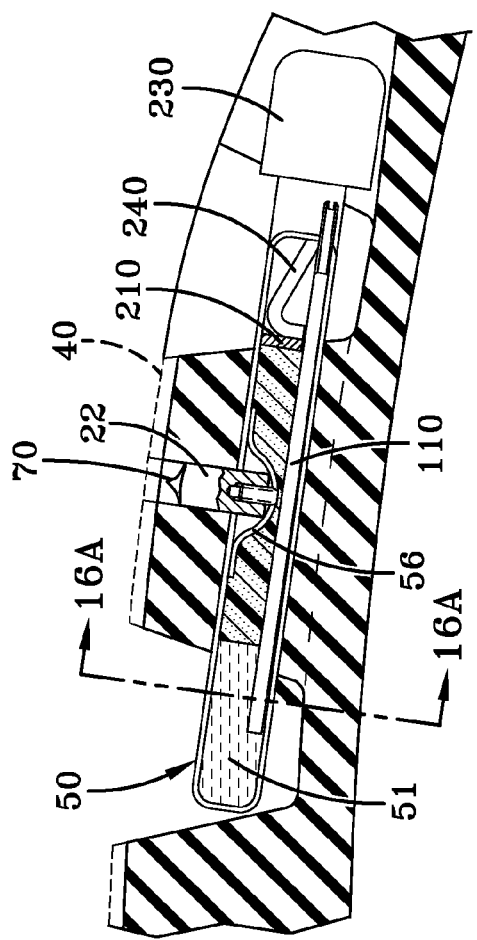
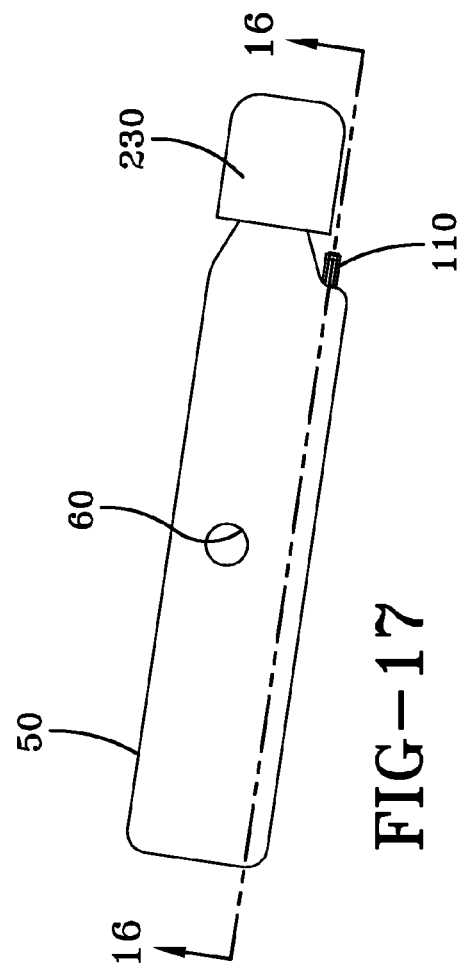

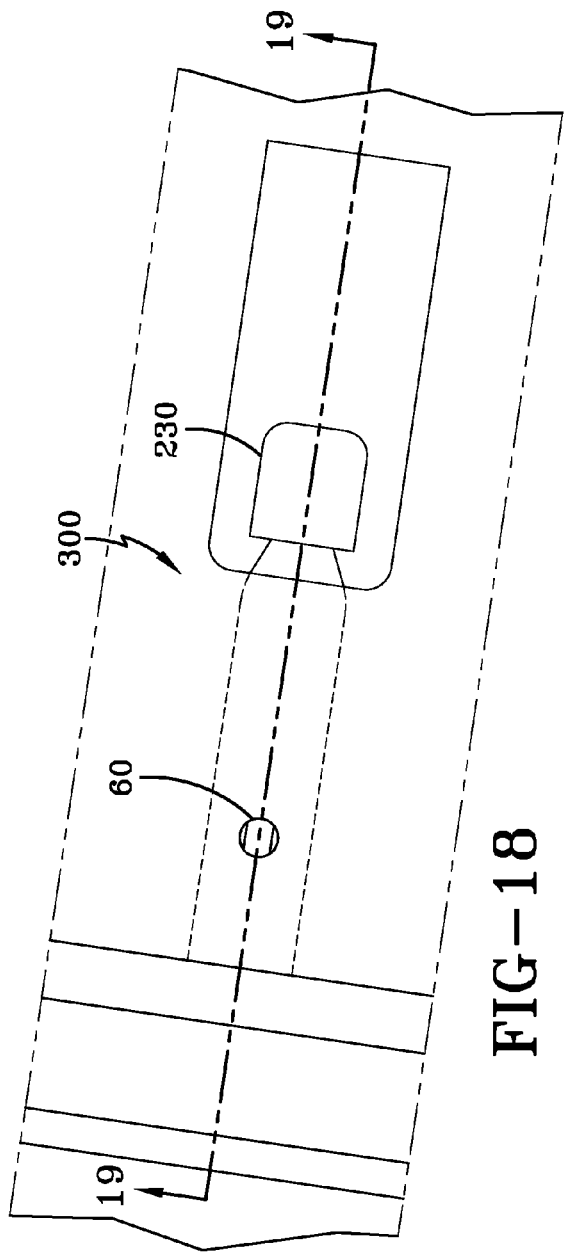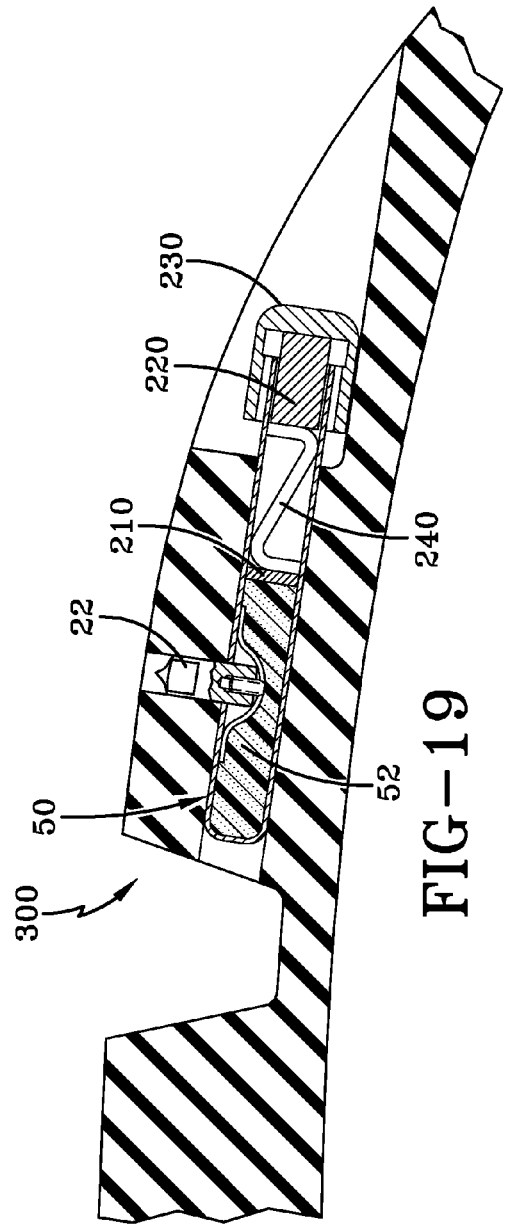

TIRE WITH RETRACTABLE STUD

This application claims the benefit of, and incorporates by reference, U.S. Provisional Application No. 61/018,197 filed Dec. 31, 2007.

FIELD OF THE INVENTION

The invention relates in general to pneumatic tires for vehicles having studs for traction.

BACKGROUND OF THE INVENTION

It is known in the prior art to provide tires with studs. Prior art tire studs provided excellent traction during severe driving conditions, particularly in heavy snow. However, prior art tire studs were not retractable and often caused damage to roads in normal driving conditions. Many states have outlawed their usage due to the road damage. Thus it is desired to provide an improved tire that has retractable tire studs capable of providing excellent traction in severe driving conditions while being retractable to prevent damage to roadways in normal driving conditions.

DEFINITIONS

"Aspect Ratio" means the ratio of a tire's section height to its section width.

"Axial" and "axially" mean the lines or directions that are parallel to the axis of rotation of the tire.

"Bead" or "Bead Core" mean generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Block element" means a tread element defined by a circumferential groove or shoulder and a pair of laterally extending grooves.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the side edges of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Rib" means a circumferentially extending strip of rubber of the tread which is defined by at least one circumferential groove and either a second circumferential groove or a lateral edge, wherein the strip is not divided by full depth grooves.

"Side edge" means a portion of a tire between the tread and the bead.

"Sipe" means small slots or elongated void areas typically formed by thin steel blades, and which tend to remain closed, and function to increase traction.

"Laminate structure" means an unvulcanized structure made of one or more layers of tire or elastomer components such as the innerliner, side edges, and optional ply layer.

BRIEF DESCRIPTION OF THE DRAWINGS

The invention will be described by way of example and with reference to the accompanying drawings in which:

FIG. 8 illustrates the stud with respect to the external surface of the tread at different ambient temperatures;

FIGS. 9 and 10 illustrate a tread bridge assembly;

FIG. 16 is a cross-sectional view in the direction A-A of FIG. 17;

FIG. 17 is a partial top view of a fourth embodiment of a retractable stud assembly of the present invention shown installed in a portion of a tire tread;

FIG. 18 is a cross-sectional view in the direction A-A of FIG. 19;

FIG. 19 is a partial top view of a fifth embodiment of a retractable stud assembly of the present invention shown installed in a portion of a tire tread.

DETAILED DESCRIPTION OF THE INVENTION

Figure 1:
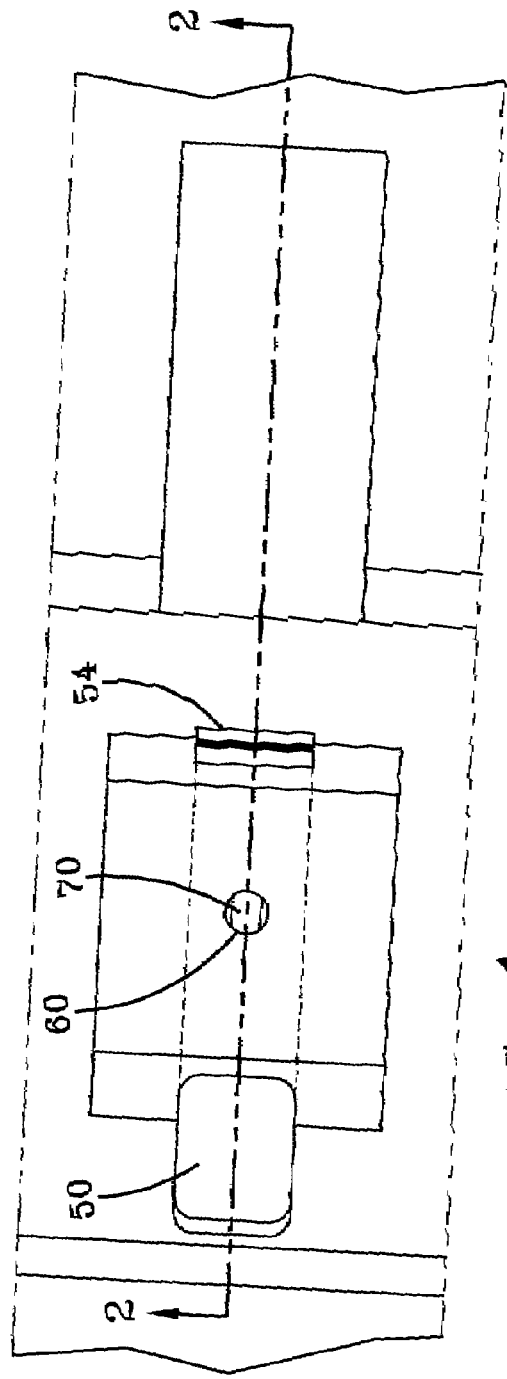
FIG. 1 is a partial top view of a first embodiment of a retractable stud assembly of the present invention shown installed in a portion of a tire tread.
Figure 2:
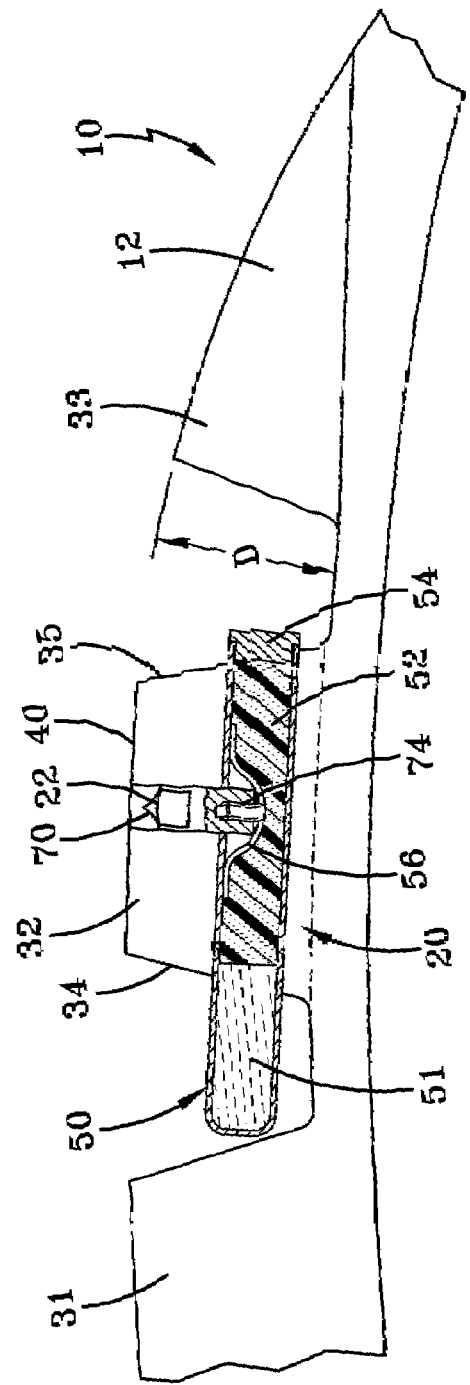
FIG. 2 is a cross-sectional view in the direction A-A of FIG. 1.
Figure 3:
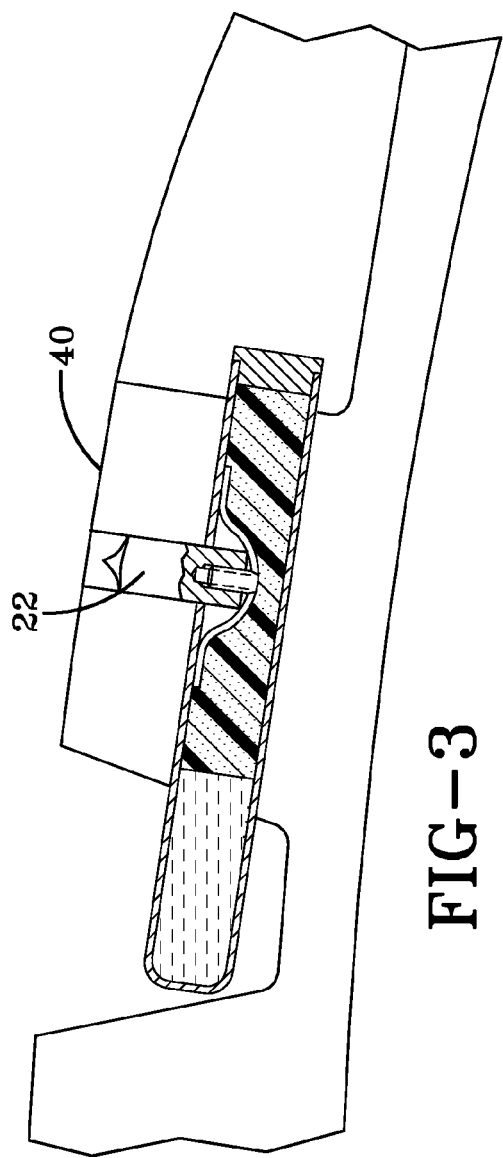
FIG. 3 illustrates the retractable stud with temperatures over 0 degrees.
Figure 4:
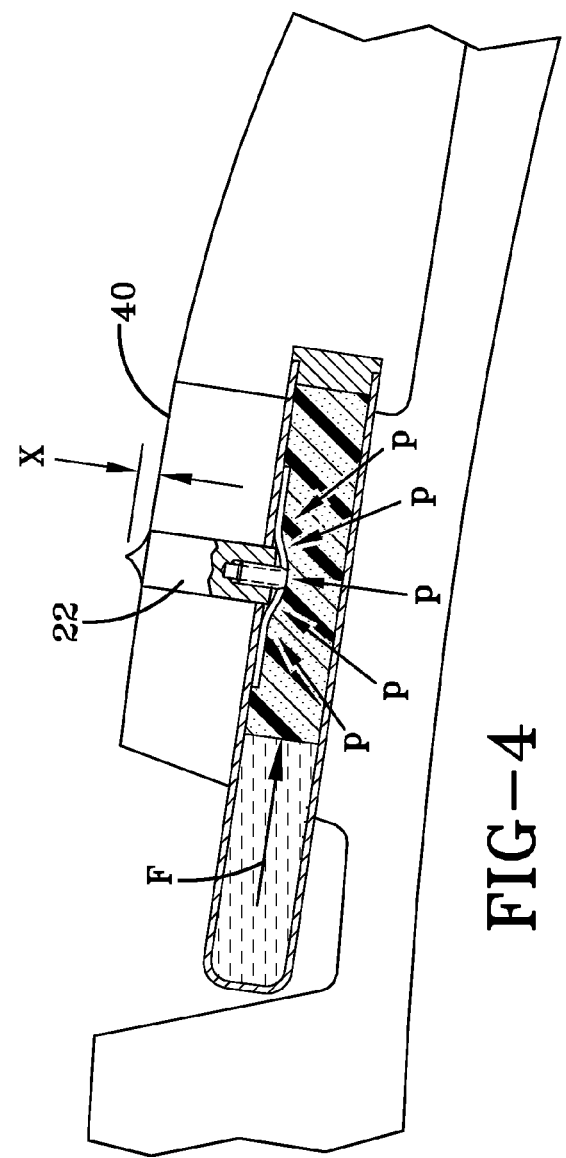
FIG. 4 illustrates the retractable stud with temperatures below 0 degrees.

FIGS. 1 and 2 illustrate a first embodiment of a retractable stud, suitable for use in pneumatic tires such as passenger or truck tires where enhanced traction may be desired. A partial view of a portion of a tire 10 is shown in FIGS. 1 and 2. The tire 10 has a tread 12 with a non-skid depth D. The tire tread 12 may comprise a plurality of circumferentially continuous ribs, which may vary, but are shown for example as ribs 31, 32 and 33. Positioned between each rib is a circumferential groove 34, 35. The 12 tread may also comprise optional sipes (not shown).

The tire 10 further comprises one or more retractable stud assemblies 20 which are mountable in the tire tread. The retractable stud assembly 20 is self adjusting, and its principle of operation is based upon the physical expansion and contraction properties of fluid such as water. For example as shown in FIG. 8, if the air ambient temperature is about 10 degrees C., and water is utilized as part of the actuating mechanism, the stud pin 22 is located below the external surface 40 of the tire. As the temperature gets colder the water freezes and expands, the stud pin 22 raises radially outwards due to the expansion of a water bladder in cooperation with the stud pin, as described in more detail, below. At −10 degrees C., the stud pin 22 is fully actuated. The stud pin of the invention also provides for manual actuation of the stud pin.

The retractable stud pin assembly 20 includes a reservoir housing 50 that is preferably encased in a hard outer casing such as steel. The reservoir houses a fluid 51 that may be liquid or gas, but is preferably water. The reservoir 50 further houses an elastomer material 52 that is located adjacent the fluid 51. The elastomer material preferably acts to constrain the fluid 51 in one end of the reservoir. The elastomer material may be silicone, rubber or other flexible material. The reservoir further comprises a cap 54 to enclose the reservoir. The reservoir 50 further comprises a spring 56 that preferably has a curved cross-section. Preferably, the spring 56 has a bottom portion 57 with a threaded male member 58 projecting therefrom. Preferably the spring has a U shaped bottom with the threaded male member mounted in the center of the bottom portion and mounted to be orthogonal with respect to the plane of the bottom portion. The threaded male member 58 is positioned to align with a hole 60 in the reservoir 50.

Figure 5:
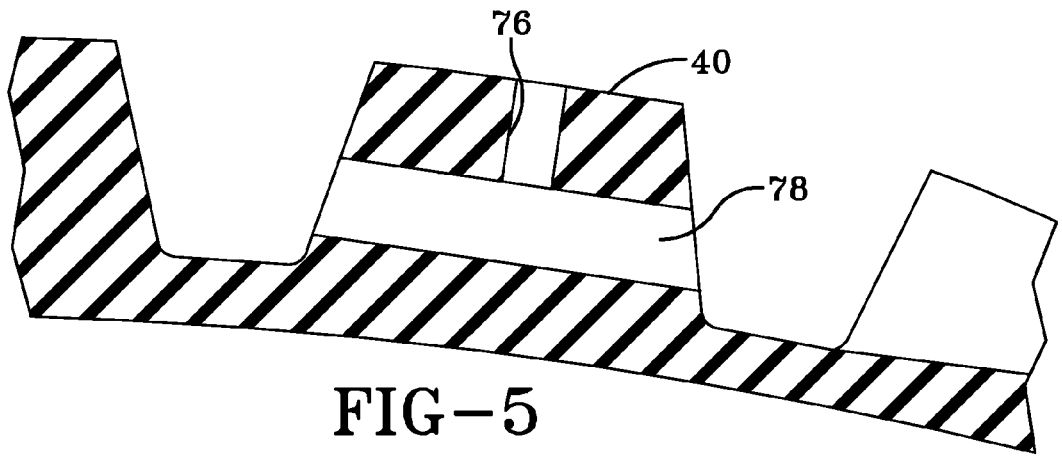
FIGS. 5-7 illustrate assembly of the retractable stud into a tire tread.
Figure 6:
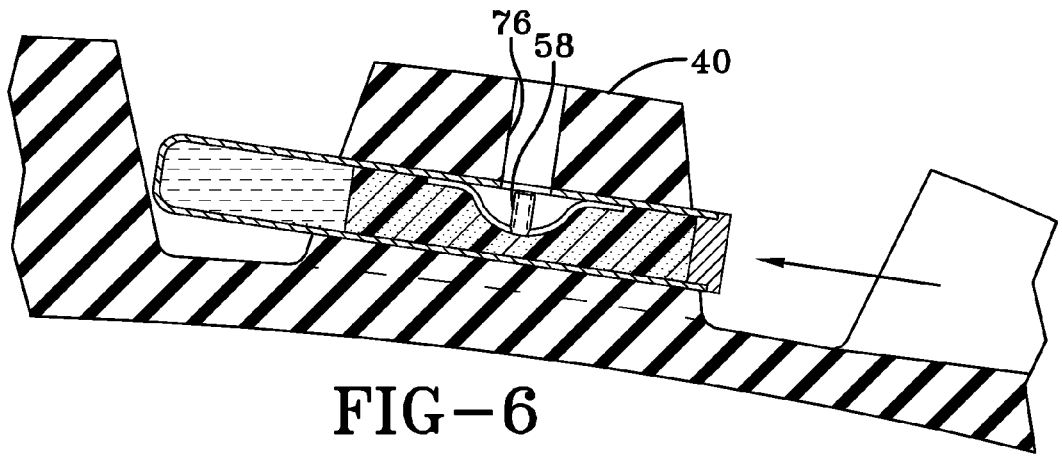
Figure 7:
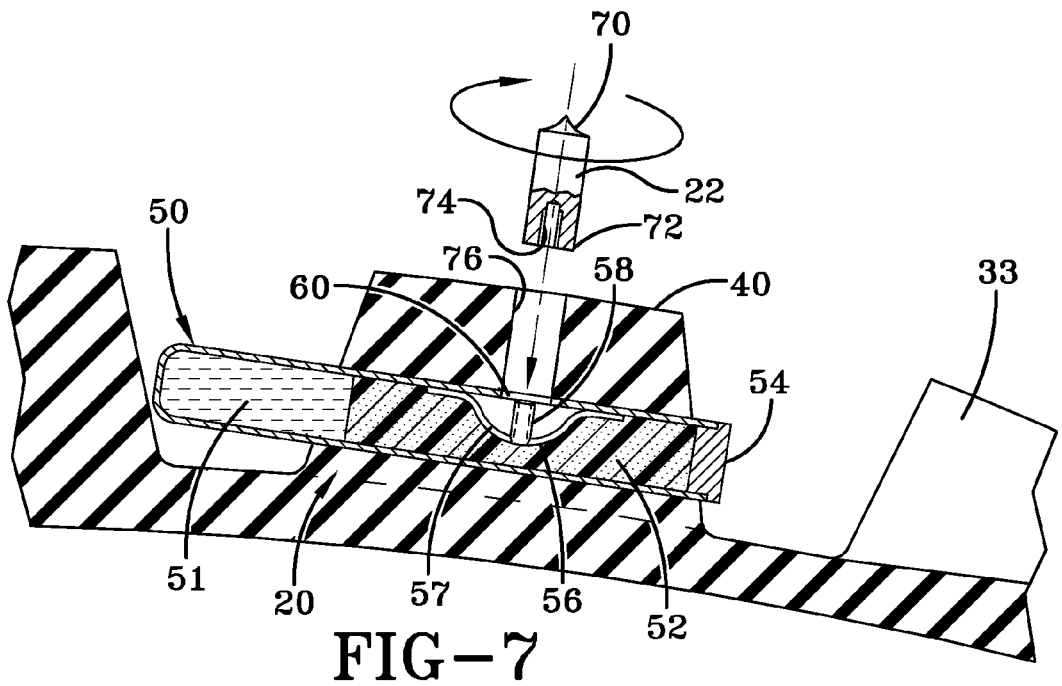

The stud pin 20 has a first end 70 that may be any desired shape, and a second end 72 that has an inner threaded hole 74 for reception on threaded male member 58. Thus the stud pin 20 may be actuated by the reservoir assembly to raise and lower in hole 76 of tread 12. The stud pin assembly 20 may be mounted in tire tread 12 after the tire has been manufactured. The tire tread 12 has a groove 78 formed in a first direction of the tread block 12 with a groove 76 that intersects groove 78 in a second direction. See e.g., FIG. 5. For example, the first groove may have a longitudinal axis that extends in an axial direction and a second groove that extends in a radial direction. Prior to insertion into the groove 78, the reservoir casing is filled with fluid such as water, and then the elastomer material 52, the spring with threaded member, and the end cap 54 is inserted. The assembly is then inserted into groove 78 as shown in FIG. 6. The threaded member is aligned with groove 76. The stud pin 22 is then inserted into groove 76 so that the threaded end 72 is positioned radially inward and aligned for reception onto male threaded member 58 as shown in FIG. 7. The stud pin is then screwed onto the male member 58. The stud pin height may vary as desired, and the stud pins may be changed out or replaced manually.

The retractable pin assembly 20 may also be installed in a bridge 100 of a tire tread that spans between and across two adjacent tread blocks A and B, as shown in FIGS. 9 and 10. The reservoir 50 is mounted in the groove formed underneath the rubber bridge 100 and extends in an axial direction in the groove between the two tread blocks A,B in this example (although not limited to same).

Operation of the assembly may now be described. The fluid compartment end of reservoir of the retractable pin assembly is preferably located in a groove such that it is external to the tire in order to sense the ambient temperature. As the temperature cools, the water or fluid in the reservoir expands, exerting an axial force on the elastomer member 52. As the elastomer member 52 is compressed, it exerts pressure on spring 56. As the pressure on spring 56 increases, it pushes the stud up through the groove 76 and past the external surface 40 of the tire. As the temperature increases, the stud retracts into the groove 76.

Figure 11:
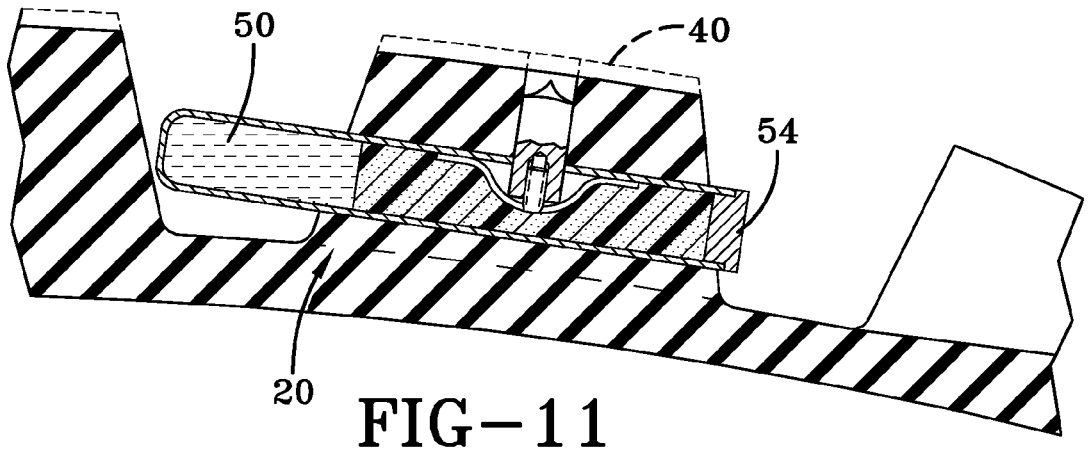
FIG. 11 illustrates the assembly of FIG. 1 shown in a worn tire.
Figure 12A:
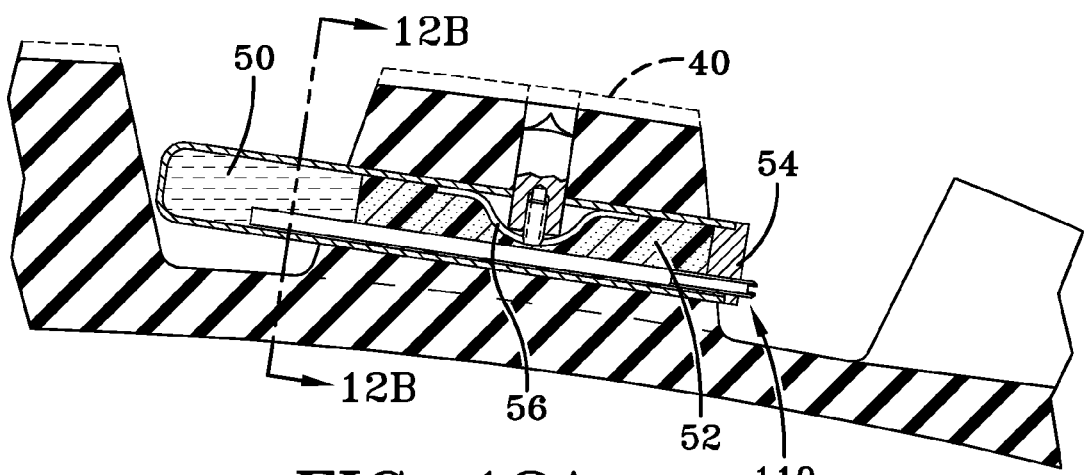
FIG. 12 illustrates a second embodiment of a retractable stud assembly having a manually adjustable retractable stud assembly.
Figure 12B:
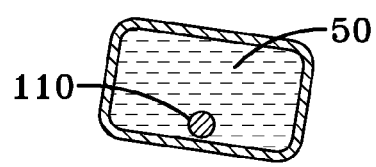

FIG. 11 illustrates the retractable stud assembly as the tire wears. As the tire wears, the external surface 40 of the tire moves radially inward, approaching the height of the stud pin. One solution may be to change out the stud pins to shorter pins. Another solution is to provide an manual adjustment mechanism as shown in FIGS. 12a and 12b. An adjustment pin 110 is inserted into the reservoir and extends under the elastomer into the fluid portion. As the adjustment pin 110 is inserted into the fluid portion of the reservoir, the volume of the pin acts to effectively increase the fluid volume, and decrease the pin height. Thus the pin acts as an adjustable volume displacement device to fine tune the pin height. The adjustable pins may be used to manually actuate the pins of the studs are not at a sufficient height.

Figure 13:
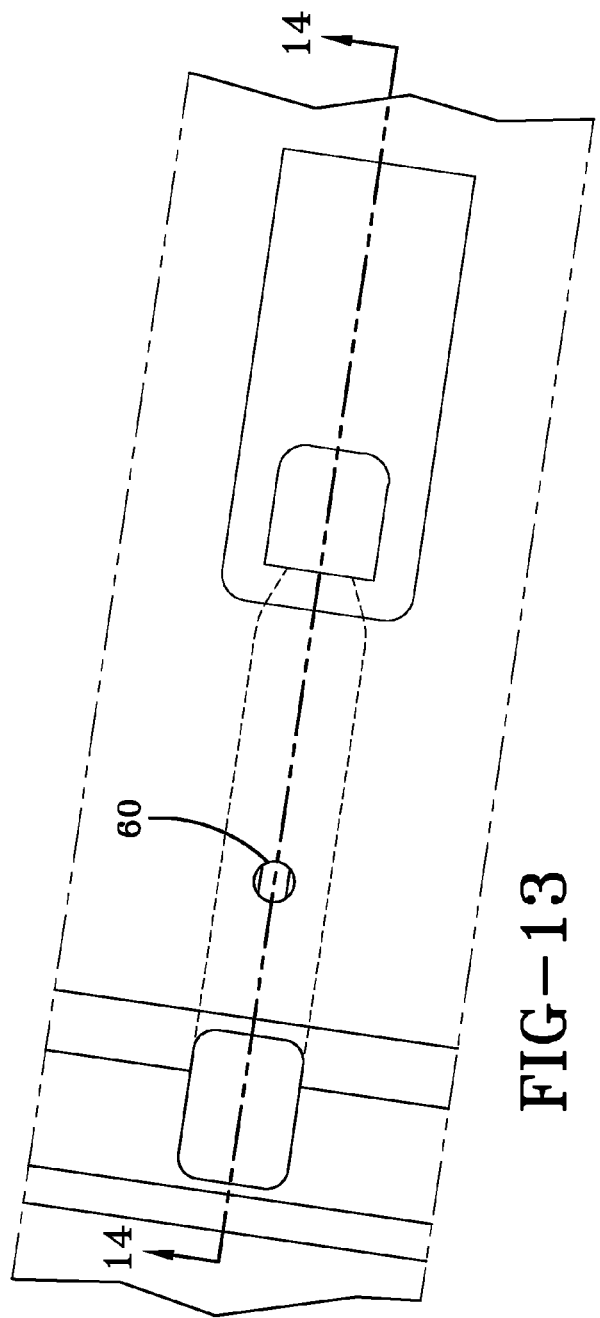
FIG. 13 is a partial top view of a third embodiment of a retractable stud assembly of the present invention shown installed in a portion of a tire tread.
Figure 14:
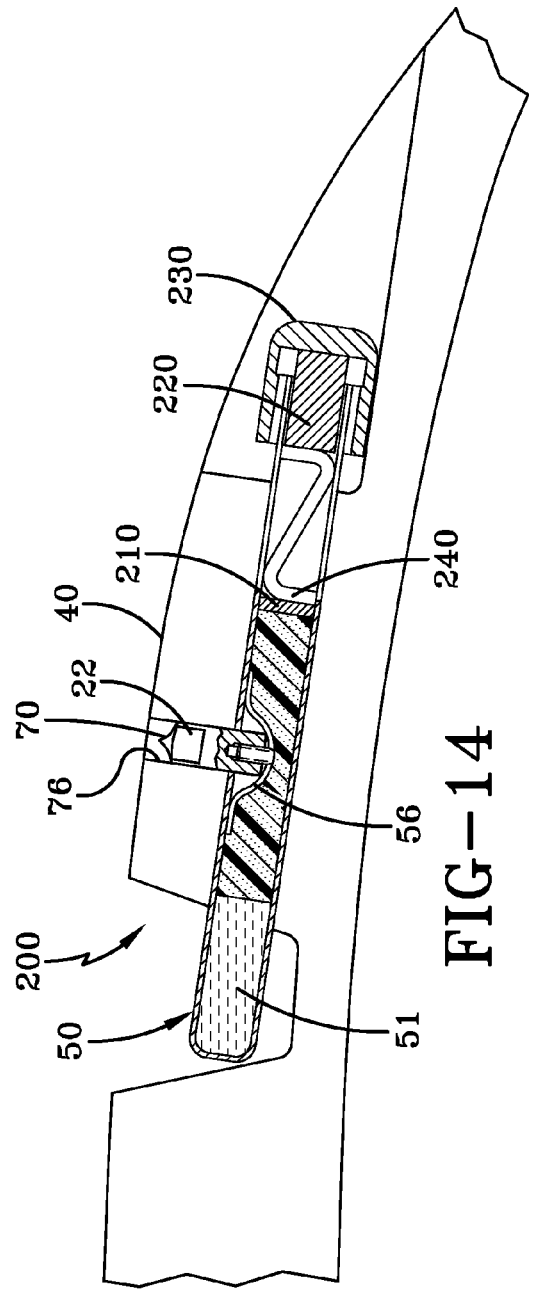
FIG. 14 is a cross-sectional view in the direction A-A of FIG. 13.
Figure 15:
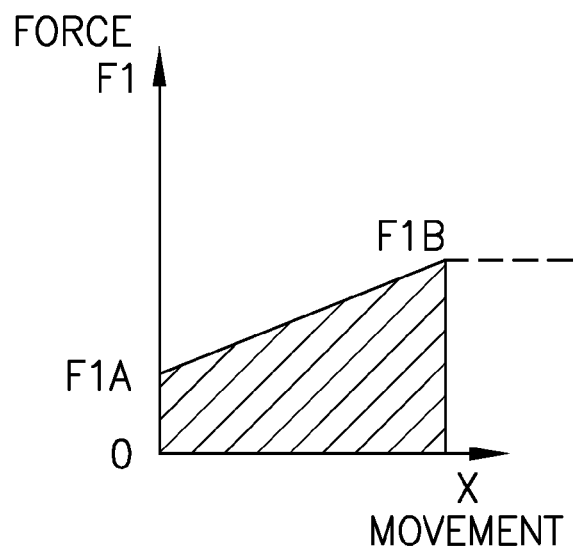
FIG. 15 illustrates the springs characteristics.
Figure 15:
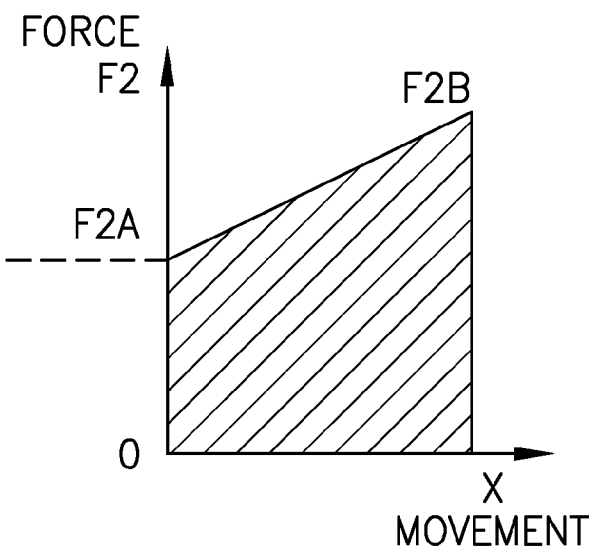

FIG. 13 illustrates a third embodiment 200 of a retractable stud assembly. The third embodiment is the same as described above (with or without the adjustable pin), except for the following differences. End cap 54 has been removed and replaced with washers 210, 220. An adjustable nut 230 is secured to the reservoir end to enclose the assembly. A compression spring 240 is located between the first and second washer 210,220. As shown in FIG. 15, the minimum force of compression of the compression spring 240 must be higher than the maximum compression force of spring 56. The compression spring provides improved flexibility of the pins on the road. Further, the embodiment may further include the adjustable pin to increase or decrease fluid volume. Still further yet, the adjustable nut 230 may be utilized as an adjustment mechanism, either alone or together with adjustment pin. FIG. 13 illustrates the assembly without an adjustable pin 110, while FIG. 16 illustrates the third embodiment with the adjustable pin 110. If the temperature increases, the adjustable nut 230 may be unscrewed. As the nut is unscrewed, its movement decreases compression spring force which lowers the stud pin in the groove. If it is desired to actuate the pins, the adjustable nut 230 can be screwed in to increase compression force, and thereby raise the pins.

FIGS. 18 and 19 illustrate a fourth embodiment of the invention. The fourth embodiment is the same as described above except for the following differences. The fluid 51 in reservoir 50 and adjustable pin 110 have been removed. The retractable stud pins are manually actuated by adjustable nut 230.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire comprising: a tread, the tread having a non-skid depth (NSK), the tread including one or more retractable stud pin assemblies, wherein the one or more stud pin assemblies include a housing having an elastomer compartment in mechanical cooperation with a first spring for movement in a first plane, wherein the stud pin is mounted to the first spring, the housing further including a second compression spring having movement in a second plane different from said first plane, and an adjustable nut assembly in mechanical cooperation with the compression spring.

2. The pneumatic tire of claim 1 wherein the assembly includes a reservoir including a liquid compartment and a elastomer compartment, wherein the first spring is separated from the liquid compartment by the elastomer.

3. The pneumatic tire of claim 2 wherein the elastomer is silicone.

4. The pneumatic tire of claim 2 further comprising an adjustable pin which is positioned to extend into the fluid compartment.

5. The pneumatic tire of claim 1 further including an elastomer compartment.

6. The pneumatic tire of claim 1 wherein the spring further includes a threaded member and the one or more stud pins are threaded onto the threaded member.

7. The pneumatic tire of claim 1 wherein the housing further includes a liquid compartment.

8. The pneumatic tire of claim 1 wherein the housing further includes a liquid compartment and an adjustment screw in communication with the liquid compartment.

* * * * *